United States Patent [19]

Wada et al.

[11] 3,886,092

[45] *May 27, 1975

[54] PROCESS FOR PRODUCING UNSATURATED CARBOXYLIC ACIDS

[75] Inventors: Masahiro Wada, Ikeda; Isao Yanagisawa, Osaka; Michikazu Ninomiya, Kobe; Takashi Ohara, Nishinomiya, all of Japan

[73] Assignee: Nippon Shokubai Kagaku Kogyo Co., Ltd., Osaka, Japan

[ * ] Notice: The portion of the term of this patent subsequent to Nov. 27, 1990, has been disclaimed.

[22] Filed: Sept. 12, 1973

[21] Appl. No.: 396,474

Related U.S. Application Data

[62] Division of Ser. No. 190,661, Oct. 19, 1971, Pat. No. 3,833,649.

[52] U.S. Cl. ............... 252/443; 252/456; 252/458; 252/464; 252/465; 252/467; 252/476; 260/530 N
[51] Int. Cl. ............................................. B01j 11/06
[58] Field of Search ........... 252/458, 464, 467, 443, 252/476, 456, 465; 260/530 N

[56] References Cited

UNITED STATES PATENTS

| | | | |
|---|---|---|---|
| 3,435,069 | 3/1969 | Bethell et al. | 252/458 |
| 3,567,772 | 3/1971 | Yanagita et al. | 252/464 |
| 3,644,509 | 2/1972 | Allen | 252/464 |
| 3,736,354 | 5/1973 | Yanagita et al. | 252/467 |
| 3,775,474 | 11/1973 | Ohara et al. | 252/467 |

FOREIGN PATENTS OR APPLICATIONS 1,084,143   9/1965   United Kingdom

*Primary Examiner*—Arthur P. Demers
*Attorney, Agent, or Firm*—Sherman & Shalloway

[57] ABSTRACT

A process for producing unsaturated carboxylic acids, which comprises oxidizing unsaturated aldehydes in the vapor phase in the presence of a catalyst comprising a catalytic oxide supported on an inert carrier, such catalytic oxide containing metal elements in the atomic ratio Mo:V:Cu:Cr:W of 12:2–14:1–6:0–4:0–12 with the proviso that Cr + W is not 0.

8 Claims, No Drawings

PROCESS FOR PRODUCING UNSATURATED CARBOXYLIC ACIDS

This is a division of application Ser. No. 190,661 filed Oct. 19, 1971, now U.S. Pat. No. 3,833,649.

This invention relates to a process for producing unsaturated carboxylic acids. More specifically, the invention relates to a process for producing unsaturated carboxylic acids by catalytically oxidizing unsaturated aldehydes having not less than 3 carbon atoms in the vapor phase in the presence of a catalyst, for example, a process for producing acrylic acid from acrolein, or methacrylic acid from methacrolein.

Generally, in the commercial production of unsaturated carboxylic acids by the catalytic vapor phase oxidation of unsaturated aldehydes, it is of utmost importance to use catalysts which give high conversions of the unsaturated aldehydes and high selectivities to unsaturated carboxylic acids. It is required that the catalysts should be very easily produced on a commercial basis and have stability over prolonged periods of time.

Examples of the conventional catalysts for use in the production of acrylic acid or methacrylic acid by the catalytic vapor phase oxidation of acrolein or methacrolein include a catalytic oxide composed of molybdenum and vanadium as disclosed in Japanese Pat. No. 1775/66, and a catalytic oxide composed of molybdenum, vanadium, aluminum and copper as disclosed in Japanese Pat. No. 26287/69. The specification of Japanese Pat. No. 1775/66 discloses that with the catalyst used there, the maximum one-pass yield of acrylic acid is 76.4 %. Such a yield is still unsatisfactory for commercial operation. According to the specification of Japanese Pat. No. 26287/69, the yield of acrylic acid can be 97–97.5 % at a space velocity of 500 to 1,000 hr$^{-1}$ when aluminum sponge is used as a carrier and the catalyst is used in a strongly reduced condition by pretreatment (in a state where oxygen is insufficient). However, when the space velocity is reduced to 2,000 hr$^{-1}$, the yield abruptly goes down to 89.5 %. In addition, the pretreatment for strongly reducing the catalyst includes a step of treating the catalyst with a reaction gas at a temperature higher than the reaction temperature, and therefore, various difficulties are encountered.

Accordingly, an object of the present invention is to provide a process for producing unsaturated carboxylic acids which can be operated on a commercial basis using a novel catalyst.

It has now been found that by using a catalytic oxide comprising molybdenum, vanadium, copper, chromium, and/or tungsten, and oxygen supported on an inert carrier, unsaturated carboxylic acids, for example acrylic acid or methacrylic acid can be obtained in very high one-pass yields from unsaturated aldehydes, for example acrolein or methacrolein, and the above object of the present invention can be achieved.

The catalytic oxide used in the present invention is characterized in that the metallic elements which constitute it are present in the following atomic ratios: Mo:V:Cu:Cr:W= 12:2–14:1–6:0–4:0–12 (with the proviso Cr + W ≠ O). Oxygen in the catalytic oxide need not be present in a specially reduced condition. It is assumed that oxygen is present in the catalytic oxide in the form of a complex metal oxide or metal acid salt. Therefore, the amount of oxygen present in the catalytic oxide varies according to the atomic ratios of the metal elements that constitute the catalytic oxide.

As the inert carrier for supporting the catalytic oxide in the present invention, natural, inert porous substances may be exemplified, or inert porous substances. Specific examples include alpha-alumina, silicon carbide, pumice, silica, zirconia, titanium oxide, or mixtures of these. The inert carrier that is conveniently used in the present invention has a surface area of not more than 2 m$^2$/g and a porosity of 30 to 65 %, at least 90 % of the pores having a pore diameter in the range of 50 to 1,500 microns.

The catalyst used in the present invention can be prepared for example by adding an aqueous solution of ammonium bichromate and an aqueous solution of copper nitrate to an aqueous solution containing ammonium molybdate, ammonium paratungstate, and ammonium metavanadate, pouring a carrier material into the mixture, heating the mixture to evaporate it to dryness and thereby to deposit the compounds on the carrier, if desired molding it into tablets for instance, and then calcining it at 350°–600°C. Any compound which can form a catalytic oxide by calcination such as hydroxides or carbonates can be used as materials for the production of the catalysts.

The catalytic vapor phase oxidation process of the present invention can be performed by passing a gaseous mixture consisting of 1 to 10 % by volume of an unsaturated aldehyde (for example, acrolein, or methacrolein), 5 to 15 % by volume of molecular oxygen, 20 to 60 % by volume of steam, and 20 to 50 % by volume of an inert gas over the catalyst prepared as above described, at a temperature of 200° to 350°C. and a pressure of atmospheric pressure to 10 atmospheres. The space velocity is maintained at 500 to 5,000 hr$^{-1}$. The reaction can be carried out either in a fixed bed or in a fluidized bed.

According to the present invention, the one-pass yield of the unsaturated carboxylic acid can be maintained high without a decrease in the space velocity. While not wishing to be limited by any theory, it is assumed that this is perhaps because the catalytic activity is regulated by the bonding of complex oxides of copper, chromium, and tungsten or acid salts with the Mo-V system, and that it is controlled by the porosity of the carrier.

The invention will be described in detail by the following Examples and Comparative Examples which are presented for illustrative, rather than limitative, purposes.

The conversion, selectivity, and one-pass yield used in the present specification and claims are defined as follows:

$$\text{Conversion (\%)} = \frac{\text{Moles of an unsaturated aldehyde reacted}}{\text{Moles of an unsaturated aldehyde fed}} \times 100$$

$$\text{Selectivity (\%)} = \frac{\text{Moles of an unsaturated carboxylic acid produced}}{\text{Moles of an unsaturated aldehyde reacted}} \times 100$$

$$\text{One-pass yield (\%)} = \frac{\text{Moles of an unsaturated carboxylic acid produced}}{\text{Moles of an unsaturated aldehyde fed}} \times 100$$

EXAMPLE 1

While 5,000 ml. of water were being heated with stirring, 104 g of ammonium paratungstate, 86 9 of ammonium metavanadate, 338 g of ammonium molybdate, and 12 g of ammonium bichromate were added to the water. Separately, an aqueous solution of 86 g of copper nitrate in 300 ml. of water was prepared, and mixed with the aqueous solution obtained above. The mixed solution obtained was put into a porcelain evaporator on a warm bath, and 1,000 ml. of particulate alpha-alumina having a diameter of 3 to 5 mm (surface area 1 m²/g or less, porosity 42 %, and 92 % of the pores being of a pore diameter 75–250 microns) were added as a carrier. With stirring, the mixture was evaporated to dryness to deposit the compounds on the carrier, and then calcined for 5 hours at 400°C. As a result a catalyst in which a catalytic oxide having a metal element composition of $Mo_{12} V_{4.6} Cu_{2.2} Cr_{0.6} W_{2.4}$ deposited on the alpha-alumina carrier was obtained.

One thousand milliliters of the resulting catalyst were packed into a U-shaped stainless steel tube having a diameter of 25 cm, and the tube was immersed in a molten nitrate bath heated at 220°–260°C. A gaseous mixture consisting of 4 % of acrolein, 55 % of air, and 41 % of steam, all by volume, was fed into the tube, and reacted at a space velocity of 1,000 to 3,000 hr⁻¹. The results obtained are shown in Table 1.

COMPARATIVE EXAMPLE 1

The procedure of Example 1 was repeated except that ammonium paratungstate, ammonium bichromate, and copper nitrate were not used. As a result a catalyst in which a catalytic oxide having a metal element composition $Mo_{12} V_{4.6}$ deposited on the alpha-alumina carrier was obtained. Using this catalyst, the reaction was performed under the same conditions as set forth in Example 1. The results are given in Table 1.

COMPARATIVE EXAMPLE 2

The procedure of Example 1 was repeated except that ammonium paratungstate and ammonium bichromate were not used. As a result a catalyst in which a catalytic oxide having a metal element composition of $Mo_{12} V_{4.6}Cu_{2.2}$ deposited on alpha-alumina was obtained. Using this catalyst, the reaction was performed under the same conditions as set forth in Example 1. The results obtained are given in Table 1.

Table 1

| | Atomic ratio of metal elements in catalytic oxide | | | | | Reaction temperature (°C.) | Space velocity (hr⁻¹) | Acrolein conversion (mol%) | Acrylic acid selectivity (mol%) | Acrylic acid one-pass yield (mol%) |
| --- | --- | --- | --- | --- | --- | --- | --- | --- | --- | --- |
| | Mo | V | Cu | Cr | W | | | | | |
| Example 1 | 12 | 4.6 | 2.2 | 0.6 | 2.4 | 220 | 1000 | 100 | 98.0 | 98.0 |
| | | | | | | 240 | 2000 | 99.5 | 98.0 | 97.5 |
| | | | | | | 260 | 3000 | 99.0 | 98.2 | 97.2 |
| Comparative Example 1 | 12 | 4.6 | 0 | 0 | 0 | 220 | 1000 | 49.5 | 40.0 | 19.8 |
| | | | | | | 240 | 2000 | 45.0 | 46.5 | 20.9 |
| | | | | | | 260 | 3000 | 38.0 | 51.0 | 19.4 |
| Comparative Example 2 | 12 | 4.6 | 2.2 | 0 | 0 | 220 | 1000 | 54.6 | 92.0 | 50.2 |
| | | | | | | 240 | 2000 | 46.3 | 93.0 | 43.1 |
| | | | | | | 260 | 3000 | 40.0 | 93.0 | 37.2 |

EXAMPLES 2 AND 3

Using the same catalyst as set forth in Example 1, the reaction was performed under the same conditions as in Example 1 except that the space velocity was changed to 4,000 hr⁻¹ (Example 2) and 5,000 hr⁻¹ (Example 3). The results are given in Table 2 below.

Table 2

| Examples | Space velocity (hr⁻¹) | Reaction temperature (°C.) | Conversion of acrolein (mole%) | Selectivity of acrylic acid(mole%) | One-pass yield of acrylic acid(mole%) |
| --- | --- | --- | --- | --- | --- |
| 2 | 4000 | 270 | 98.5 | 98 | 96.5 |
| 3 | 5000 | 270 | 97.0 | 97.8 | 94.9 |

EXAMPLES 4 TO 6

The procedure of Example 1 was repeated except that the composition of the gaseous mixture was changed. The results obtained are given in Table 3.

Table 3

| Examples | Composition of gaseous mixture (vol.%) | | | Reaction temperature (°C.) | Space velocity (hr⁻¹) | Conversion of acrolein (mol%) | Selectivity of acrylic acid (mole%) | One-pass yield of acrylic acid (mole%) |
| --- | --- | --- | --- | --- | --- | --- | --- | --- |
| | Acrolein | Air | Steam | | | | | |
| 4 | 5 | 55 | 40 | 270 | 4000 | 98.0 | 97.7 | 95.8 |
| 5 | 6 | 54 | 40 | 265 | 3000 | 99.0 | 97.0 | 96.0 |
| 6 | 8 | 62 | 30 | 265 | 3000 | 98.5 | 96.1 | 94.7 |

EXAMPLES 7 TO 9

The procedure of Example 1 was repeated except that a different carrier was used. The results are given in Table 4.

Table 4

| Example | Carrier | Physical properties of the carrier | | | Reaction temperature (°C.) | Space velocity (hr$^{-1}$) | Conversion of acrolein (mol%) | Selectivity of acrylic acid (mol%) | One-pass yield of acrylic acid (mol%) |
|---|---|---|---|---|---|---|---|---|---|
| | | Surface area | Porosity | Pore distribution | | | | | |
| 7 | Silicon carbide | less than 1 m$^2$/g | 55% | 75–500μ 93% | 230 | 2000 | 99.0 | 98.0 | 97.0 |
| 8 | α-alumina (50%) Silicon carbide | less than 1 m$^2$/g | 47% | 75–1000μ 95% | 230 | 2000 | 99.0 | 98.0 | 97.0 |
| 9 | α-alumina (75%) Silica | less than 1 m$^2$/g | 40% | 50–1200μ 95% | 230 | 2000 | 100 | 98.0 | 98.0 |

EXAMPLES 10 TO 14

The procedure of Example 1 was repeated except that the atomic ratio of metal elements in the catalytic oxide was varied. The results obtained are given in Table 5.

Table 5

| Example | Atomic ratio of metal elements in the catalytic oxide | | | | | Reaction temperature (°C.) | Space velocity (hr$^{-1}$) | Conversion of acrolein (mol%) | Selectivity of acrylic acid (mol%) | One-pass yield of acrylic acid (mol%) |
|---|---|---|---|---|---|---|---|---|---|---|
| | Mo | V | Cu | Cr | W | | | | | |
| 10 | 12 | 6 | 2.2 | 0 | 2.4 | 240 | 2000 | 99.0 | 98.0 | 97.0 |
| 11 | 12 | 4.6 | 2.2 | 0.4 | 4 | 250 | 2000 | 98.0 | 97.5 | 95.6 |
| 12 | 12 | 6 | 2.2 | 1.2 | 0 | 240 | 2000 | 99.5 | 98.0 | 97.5 |
| 13 | 12 | 4.6 | 4.4 | 0.6 | 2.4 | 240 | 2000 | 98.5 | 98.0 | 96.5 |
| 14 | 12 | 8 | 2.2 | 0.8 | 1.0 | 230 | 2000 | 100 | 97.5 | 97.5 |

The results obtained in Examples 1 to 14 above demonstrate that the reaction can be performed under a wide range of conditions without reducing the yield of acrylic acid.

EXAMPLE 15

Using the same catalyst and apparatus as used in Example 1, a gaseous mixture consisting of 4 % by volume of methacrolein, 51 % of air, and 45 % of steam was reacted at 340°C. and a space velocity of 2,000 hr$^{-1}$. The conversion of methacrolein was 70 %; the selectivity of methacrylic acid was 75.5 %; and the one-pass yield of methacrylic acid was 52.8 %.

What is claimed is:

1. A catalyst adapted for the production of unsaturated carboxylic acids through the vapor phase oxidation of unsaturated aldehydes comprising a catalytic oxide supported on an inert carrier, said catalytic oxide consisting essentially of the recited metal elements in the atomic ratio Mo:V:Cu:Cr:W of 12:2–14:1–6:0–4:0–12 with the proviso that Cr + W is not 0, said inert carrier having a surface area not greater than 2 m$^2$/g and a porosity of 30 to 65%, at least 90% of the pores having a pore diameter in the range of 50 to 1,500 microns.

2. The catalyst of claim 1 wherein said inert carrier is selected from α-alumina, silicon carbide, pumice, silica, zirconia, titanium oxide and mixtures thereof.

3. The catalyst of claim 1 wherein said catalytic oxide consists essentially of the recited metal elements in the atomic ratio Mo:V:Cu:Cr:W of about 12:4.6:2.2:0.6:2.4.

4. The catalyst of claim 1 wherein said catalytic oxide consists essentially of the recited metal elements in the atomic ratio Mo:V:Cu:Cr:W of about 12:6:2.2:0:2.4.

5. The catalyst of claim 1 wherein said catalytic oxide consists essentially of the recited metal elements in the atomic ratio Mo:V:Cu:Cr:W of about 12:4.6:2.2.0.4:4.

6. The catalyst of claim 1 wherein said catalytic oxide consists essentially of the recited metal elements in the atomic ratio Mo:V:Cu:Cr:W of about 12:6:2.2:1.2:0.

7. The catalyst of claim 1 wherein said catalytic oxide consists essentially of the recited metal elements in the atomic ratio Mo:V:Cu:Cr:W of about 12:4.6:4.4:0.6:2.4.

8. The catalyst of claim 1 wherein said catalytic oxide consists essentially of the recited metal elements in the atomic ratio Mo:V:Cu:Cr:W of about 12:8:2.2:0.8:1.0.

* * * * *